(12) United States Patent
Jiang et al.

(10) Patent No.: US 12,308,402 B2
(45) Date of Patent: May 20, 2025

(54) BATTERY DIRECT RECYCLING

(71) Applicant: GM GLOBAL TECHNOLOGY OPERATIONS LLC, Detroit, MI (US)

(72) Inventors: Meng Jiang, Rochester Hills, MI (US); Raghunathan K, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 630 days.

(21) Appl. No.: 17/586,935

(22) Filed: Jan. 28, 2022

(65) Prior Publication Data

US 2023/0246258 A1  Aug. 3, 2023

(51) Int. Cl.
| | |
|---|---|
| *H01M 10/54* | (2006.01) |
| *B09B 3/00* | (2022.01) |
| *B09B 101/16* | (2022.01) |
| *H01M 6/52* | (2006.01) |
| *H01M 10/04* | (2006.01) |
| *H01M 10/052* | (2010.01) |
| *H01M 10/0525* | (2010.01) |
| *H01M 10/42* | (2006.01) |
| *H01M 10/44* | (2006.01) |

(52) U.S. Cl.
CPC .............. *H01M 10/54* (2013.01); *B09B 3/00* (2013.01); *H01M 6/52* (2013.01); *H01M 10/049* (2013.01); *H01M 10/052* (2013.01); *H01M 10/0525* (2013.01); *H01M 10/4242* (2013.01); *H01M 10/44* (2013.01); *H01M 10/441* (2013.01); *H01M 10/446* (2013.01); *B09B 2101/16* (2022.01); *Y02W 30/84* (2015.05)

(58) Field of Classification Search
CPC ...... H01M 10/54; H01M 6/52; H01M 10/049; H01M 10/052; H01M 10/0525; H01M 10/44; H01M 10/441; H01M 10/4242; H01M 10/446; H01M 4/0438–0447; B09B 3/00; B09B 2101/16; Y02W 30/84
See application file for complete search history.

(56) References Cited

U.S. PATENT DOCUMENTS

| | | | |
|---|---|---|---|
| 2010/0203366 A1* | 8/2010 | Sloop | H01M 10/4242 429/49 |
| 2011/0097630 A1* | 4/2011 | Choi | H01M 50/14 429/246 |
| 2016/0240896 A1* | 8/2016 | Zhang | H01M 10/0569 |
| 2019/0036118 A1* | 1/2019 | Ofer | H01M 10/0525 |
| 2023/0275279 A1* | 8/2023 | Huang | H01M 10/0525 429/49 |

FOREIGN PATENT DOCUMENTS

FR    3027456 A3 *  4/2016

OTHER PUBLICATIONS

Translation of FR3027456 A3 into english (Year: 2016).*

* cited by examiner

*Primary Examiner* — Maria Laios
*Assistant Examiner* — Lawrence La Raia, III

(57) ABSTRACT

A method of recycling a Lithium-ion battery includes removing a plurality cells from a container of the battery without dismantling the cells, removing an electrolyte from the cells, re-lithiating the cells using lithium as a source of re-lithiation, and packaging the re-lithiated cells in a new container to form a new battery.

8 Claims, 7 Drawing Sheets

BATTERY DIRECT RECYCLING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to rechargeable batteries and more particularly to direct recycling of rechargeable batteries.

Rechargeable batteries such as lithium-ion batteries are used to power electric and other types of vehicles. The batteries are also used to power appliances such as lawncare equipment (e.g., lawn mowers, snow throwers, leaf blowers, weed trimmers, and so on). The charging capacity of these batteries deteriorates over time after repeated discharging and recharging of the batteries. When the charging capacity falls below a limit, these batteries are deemed to have reached end of life (EOL). After reaching the end of life, these batteries are typically replaced. The discarded batteries may be recycled.

SUMMARY

A method of recycling a Lithium-ion battery comprises removing a plurality cells from a container of the battery without dismantling the cells, removing an electrolyte from the cells, re-lithiating the cells using lithium as a source of re-lithiation, and packaging the re-lithiated cells in a new container to form a new battery.

In other features, the method further comprises removing the electrolyte by (i) vacuuming the cells, (ii) rinsing the vacuumed cells in a solvent, and (iii) drying the rinsed cells by heating and/or vacuuming the rinsed cells.

In other features, the re-lithiating the cells comprises immersing the cells in an electrolyte bath, immersing a sheet of lithium metal in the electrolyte bath, and connecting a charging/discharging circuit across the sheet of lithium metal and one of two electrodes of the cells.

In other features, the method further comprises determining a charge capacity of the cells by charging the cells from a first voltage of the cells at a start of the re-lithiating to a second voltage greater than the first voltage at a first current using the charging/discharging circuit. The method further comprises determining a discharge capacity of the cells by discharging the cells from the second voltage to a third voltage less than the first voltage at a second current using the charging/discharging circuit. The method further comprises determining an amount of the re-lithiating based on the charge and discharge capacities.

In another feature, the method further comprises performing the re-lithiating of the cells using the charging/discharging circuit based on the amount.

In another feature, the amount is a difference between the discharge capacity and the charge capacity.

In other features, the method further comprises filling the new container with a new electrolyte, degassing the new container, adding a sealant to connections of electrodes of the cells, and sealing the new container.

In other features, each cell includes a first pair of connections used before the recycling and a second pair of connection unused before the recycling. The method further comprises enclosing the re-lithiated cells in the new container such that the first pair of connections is enclosed in the new container and the second pair of connections is connectable to circuits outside the new battery. The method further comprises filling the new container with a new electrolyte, degassing the new container, and sealing the new container.

In still other features, a system for recycling a Lithium-ion battery comprises an electrolyte bath and a stack of cells removed from a container of the battery without dismantling the cells and immersed in the electrolyte bath. Each cell comprises a first electrode and a second electrode. The first electrodes of the cells being connected together by first connections, and the second electrodes of the cells being connected together by second connections. The system further comprises a sheet of lithium metal immersed in the electrolyte bath and a circuit connected to the sheet of lithium metal and one of the first electrodes of the cells. The circuit is configured to re-lithiate the cells according to an amount of re-lithiation predetermined for the cells.

In other features, the circuit is configured to determine a charge capacity of the cells by charging the cells from a first voltage of the cells at a start of re-lithiation to a second voltage greater than the first voltage at a first current. The circuit is configured to determine a discharge capacity of the cells by discharging the cells from the second voltage to a third voltage less than the first voltage at a second current. The circuit is configured to determine the amount of re-lithiation based on the charge and discharge capacities.

In another feature, the amount of re-lithiation is a difference between the discharge capacity and the charge capacity.

In other features, prior to immersing the cells in the electrolyte bath, an electrolyte is removed from the cells by (i) vacuuming the cells, (ii) rinsing the vacuumed cells in a solvent, and (iii) drying the rinsed cells by heating and/or vacuuming the rinsed cells.

In other features, the system further comprises a new container enclosing the re-lithiated cells. The new container is filled with a new electrolyte. A new sealant is added to connections of electrodes of the re-lithiated cells forming a new battery.

In other features, each cell includes a first pair of connections being used before the recycling and a second pair of connection being unused before the recycling. The system further comprises a new container enclosing the re-lithiated cells forming a new battery. The new container is filled with a new electrolyte. The first pair of connections is enclosed in the new container and is unused. The second pair of connections is exposed outside the new container and is connectable to circuits outside the new battery.

In still other features, a battery comprises a plurality of cells and a container enclosing the cells. Each cell comprises two electrodes. Each electrode comprises two connections on opposite ends of the electrode. The connections on a first end of the electrodes of the cells are exposed from the container and are connectable to circuits outside the battery. The container encloses the connections on a second end of the electrodes.

In another feature, the two connections on the opposite ends of each electrode are collinear.

In other features, the two connections of a positive electrode are on a first side of the positive electrode, and the two connections of a negative electrode are on a second side of the negative electrode that is opposite to the first side of the positive electrode.

In other features, the connections on the first end of positive electrodes are connected to each other, and the connections on the first end of negative electrodes are connected to each other. The connections on the second end of positive electrodes are connected to each other, and the connections on the second end of negative electrodes are connected to each other.

In other features, the cells are enclosed in a new container after recycling the battery. The connections on the second end of the electrodes are exposed from the new container for being connectable to circuits outside the battery, and the connections on the first end of the electrodes of the cells are enclosed in the new container.

In another feature, the cells are re-lithiated using lithium as a source of re-lithiation during the recycling.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Various methods are used to recycle batteries that have reached end of life. For example, in some methods, the batteries are completely dismantled (i.e., disassembled), and some of the components of the batteries such as electrodes and other materials are separated. Some of the materials from the components are recovered (e.g., by melting, crushing, etc.) and are reused as raw materials to manufacture new components for new batteries. In other methods, the batteries are completely dismantled, and some of the components are chemically treated or processed. The processed components are reused to manufacture new batteries. In these methods, however, the old batteries are structurally destroyed.

Instead, the present disclosure provides a method that directly renews an old battery without dismantling the cells of the old battery. Specifically, the method renews the old battery without discarding or destroying the electrodes in the old battery. As explained below in detail, the method re-lithiates the electrodes of the old battery using lithium as a source of lithiation, and the re-lithiated electrodes are re-packaged in a new container. Accordingly, the method renews or refurbishes an old battery rather than destructively recycling the old battery. Additionally, the method provides extra pair of tabs for each set of electrodes that can be embedded during the initial manufacture of a battery, which can simplify the renewal process. These and other features of the present disclosure are described below in detail.

Figure 1:
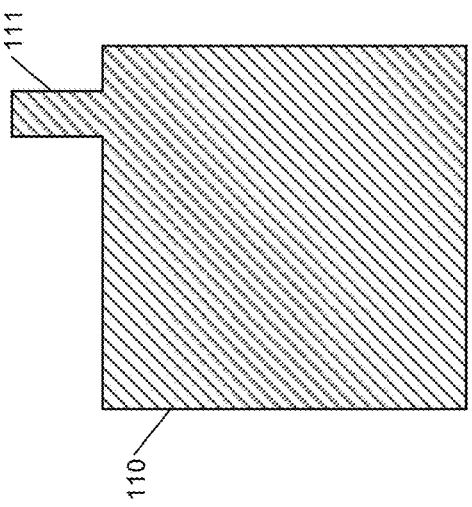
FIG. 1 shows an example of a rechargeable battery, shows components of the rechargeable battery, and shows internal structure of cells of the rechargeable battery.
Figure 1:
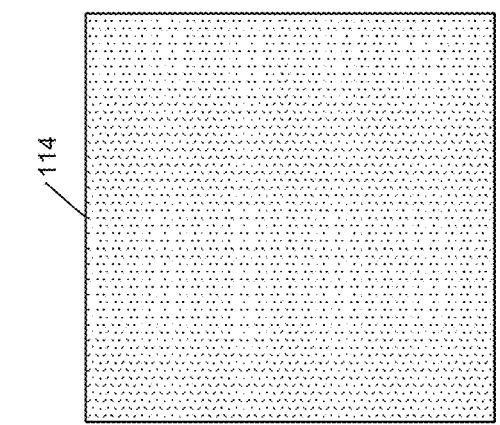
Figure 1:
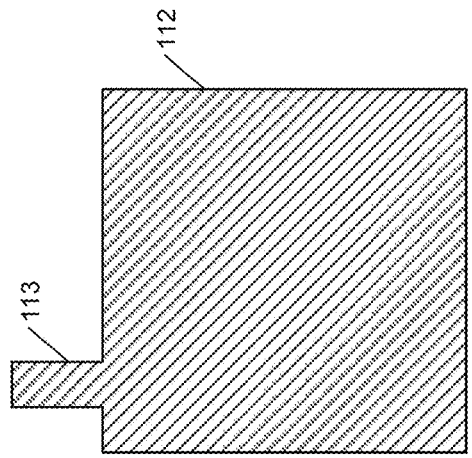
Figure 1:
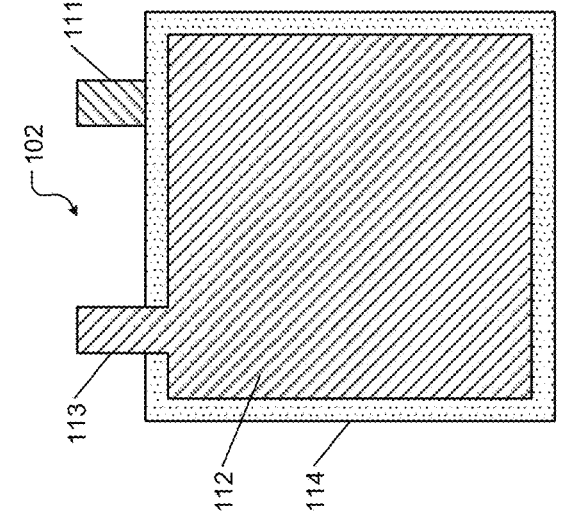
Figure 1:
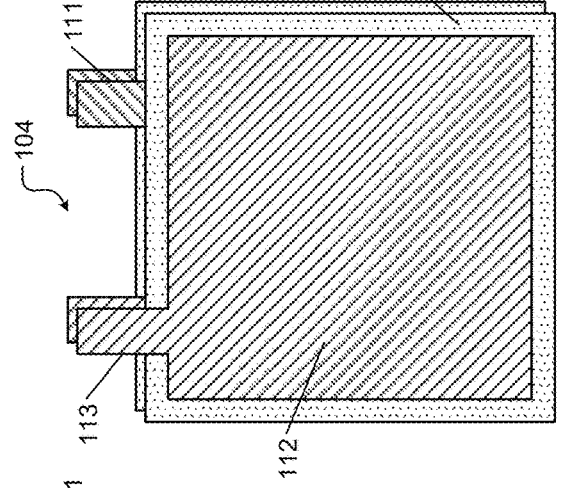
Figure 1:
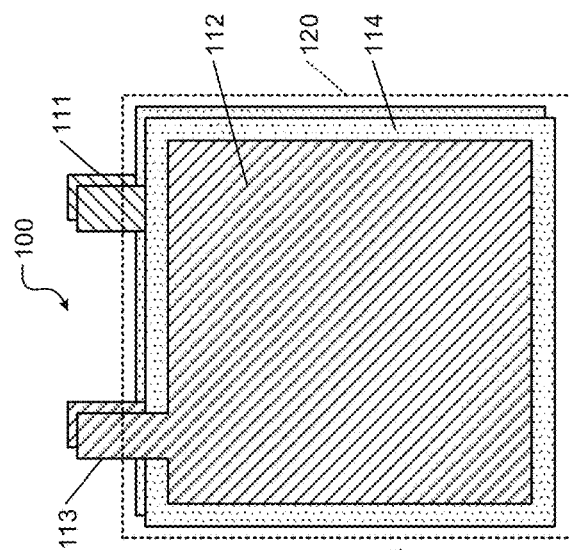
Figure 3B:
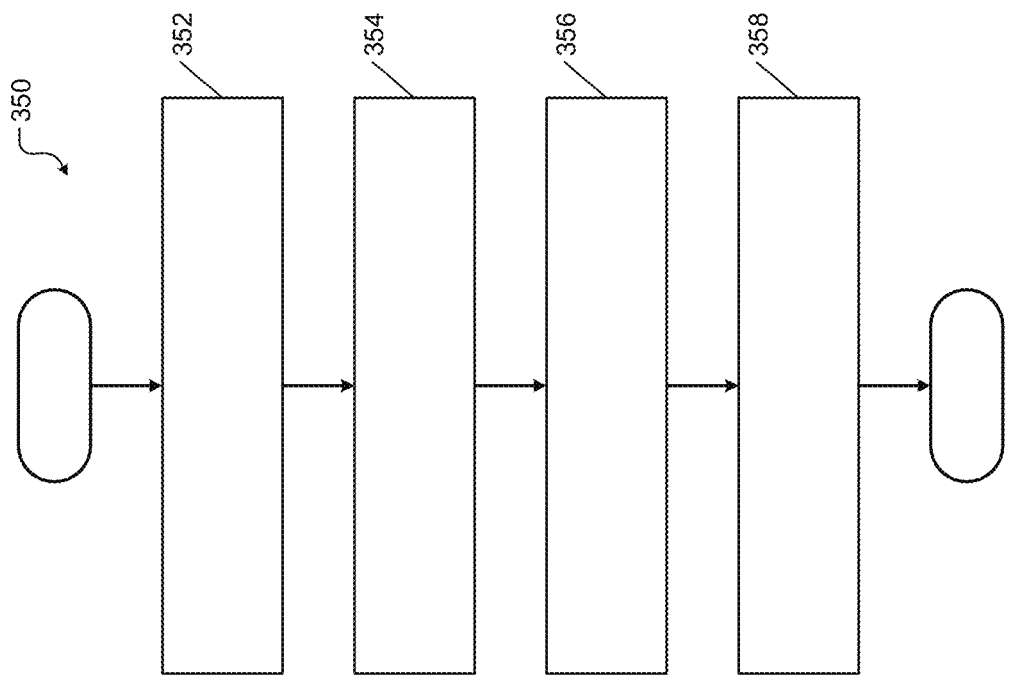
FIGS. 3A-3C show a system for re-lithiating the cells of the rechargeable battery.
Figure 3A:
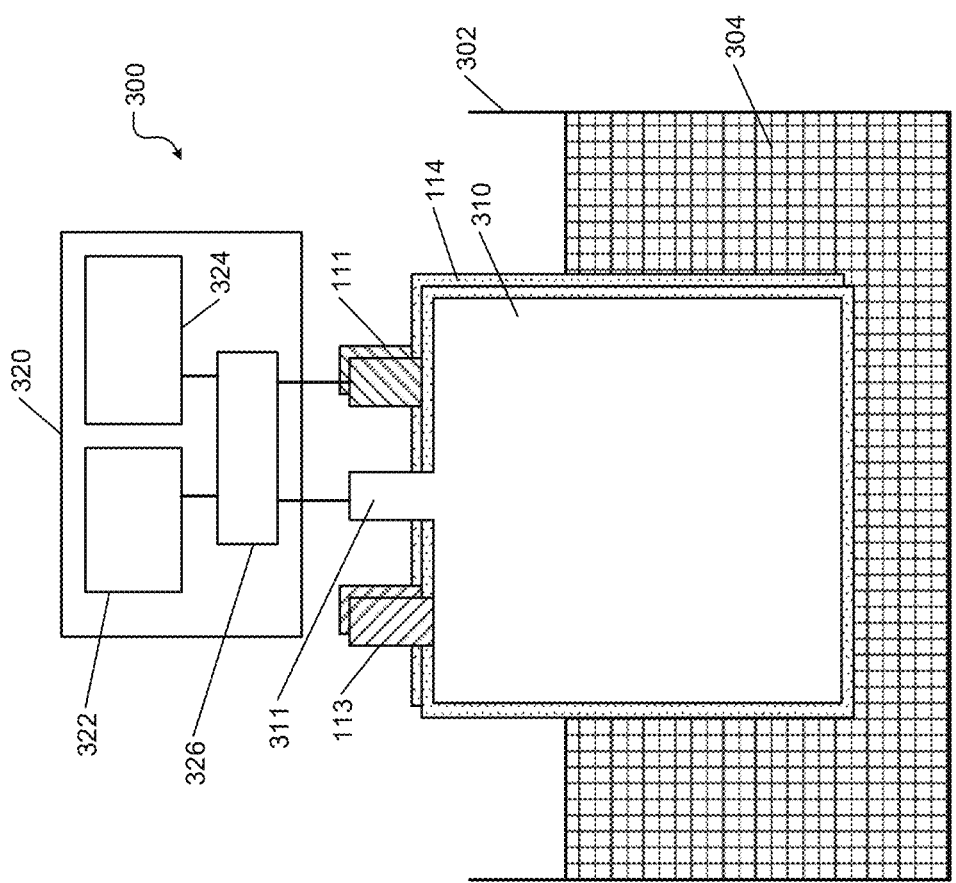
Figure 3C:
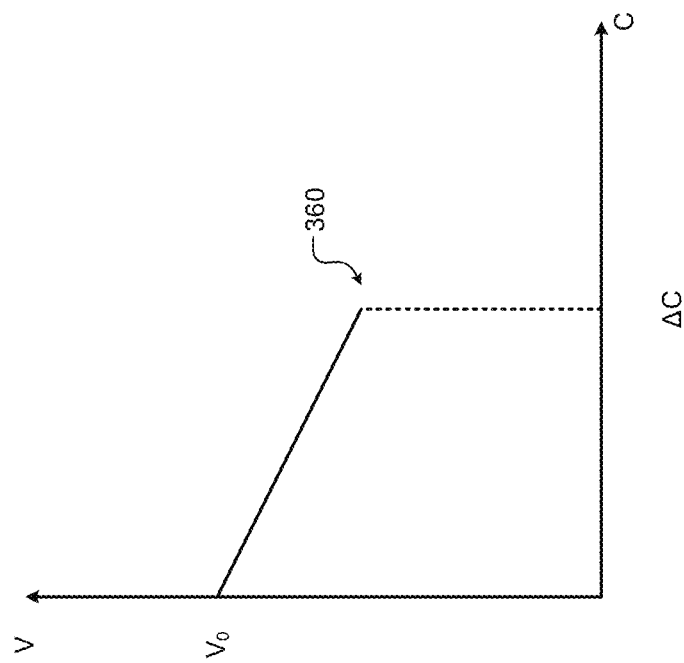
Figure 3C:
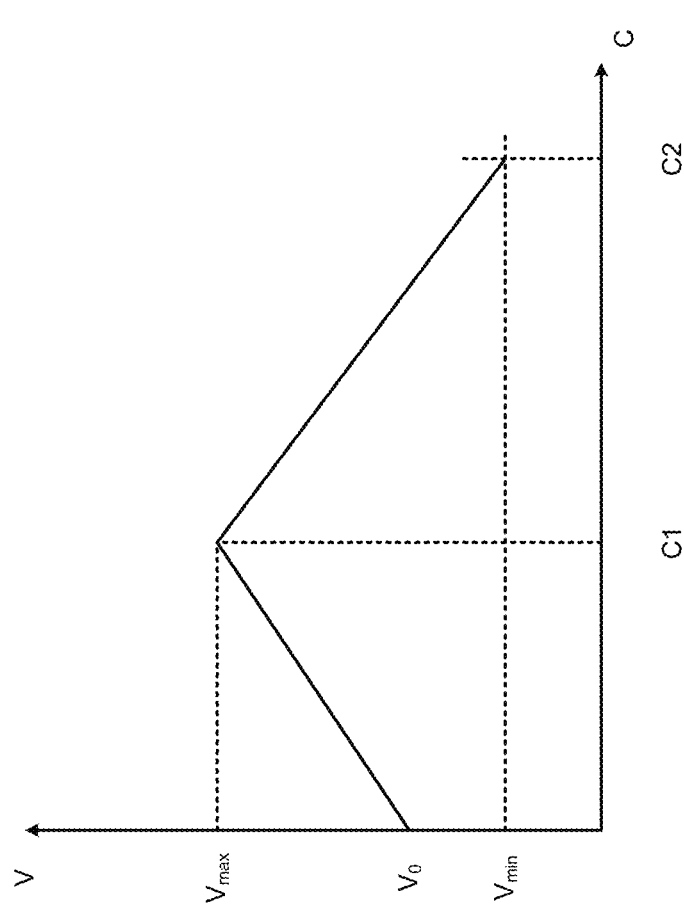
Figure 4:
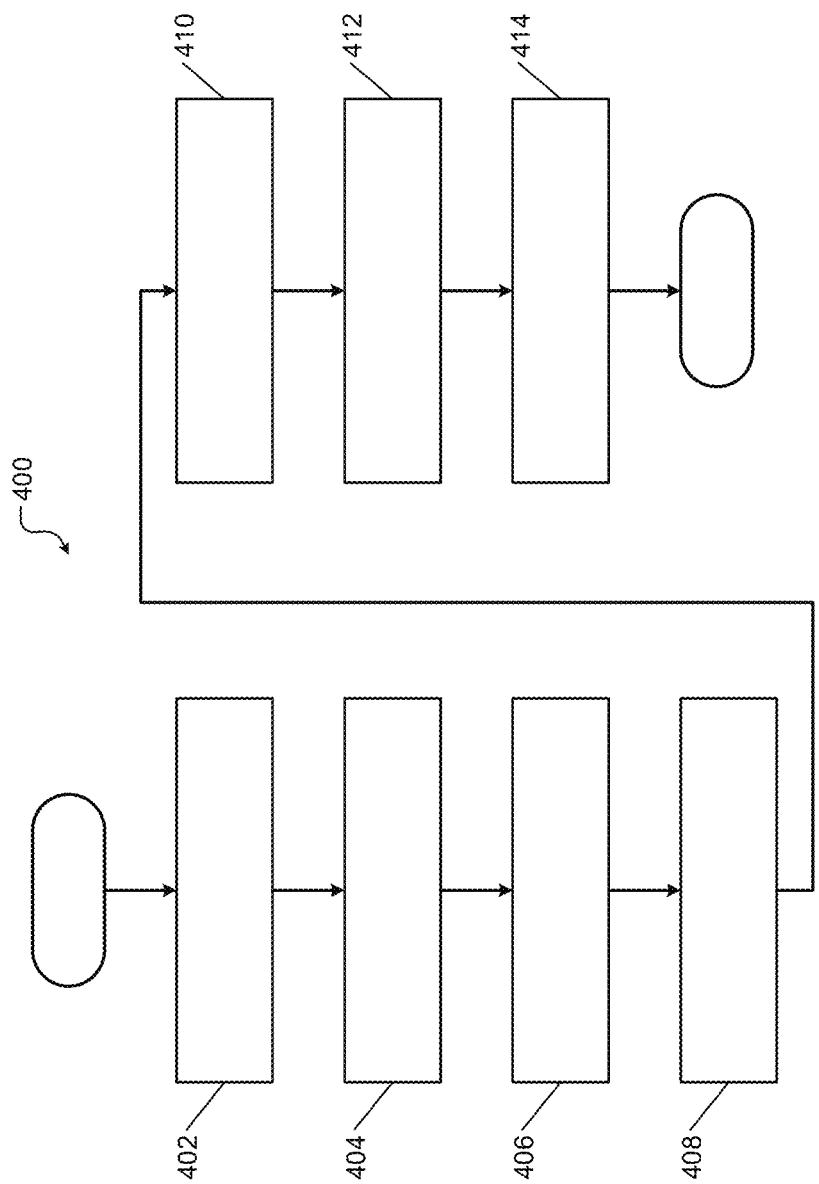
FIG. 4 shows a method of re-lithiating the cells of the rechargeable battery.
Figure 5:
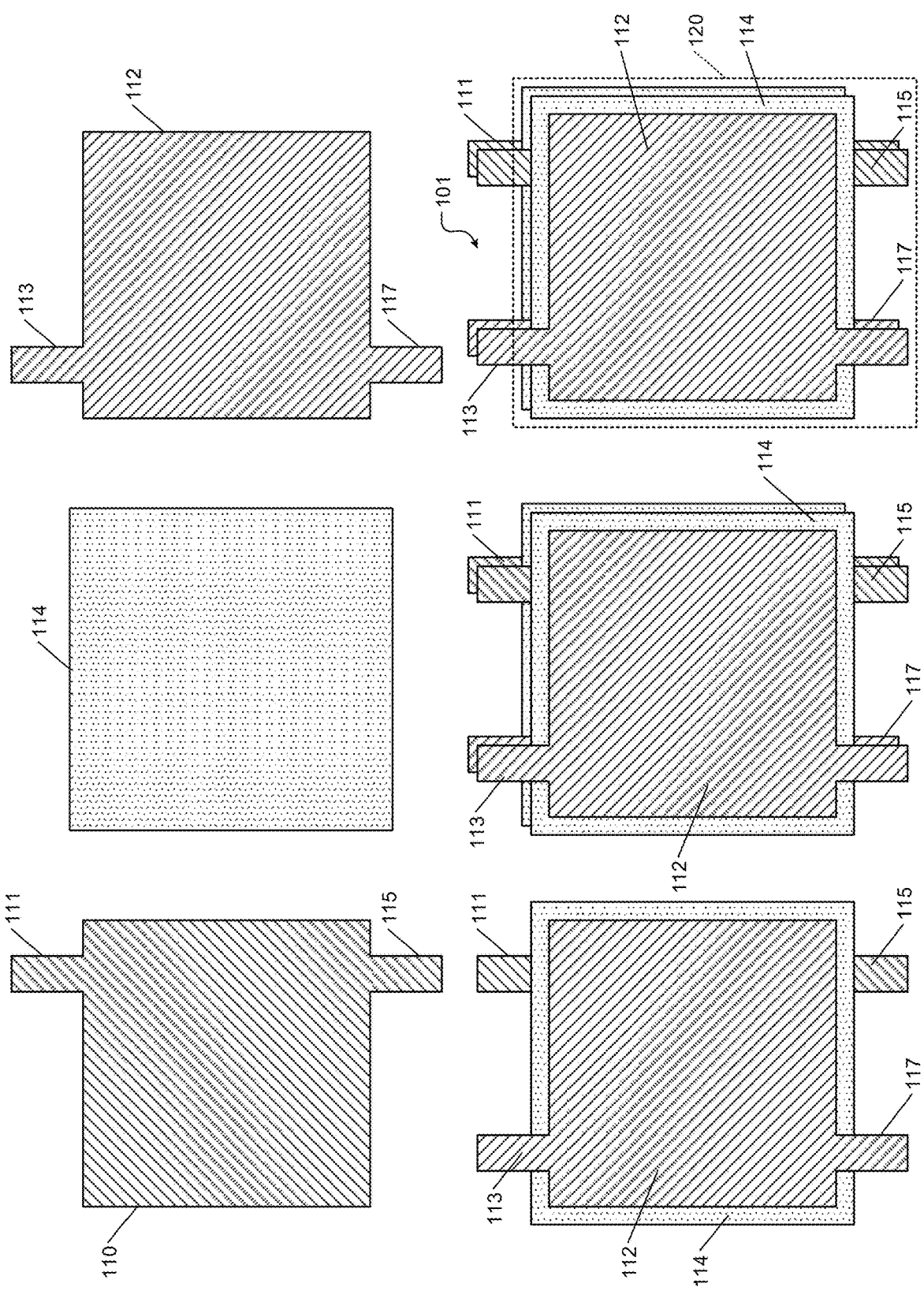
FIG. 5 shows an example of a battery with each cell having an extra pair of tabs that can be used as terminals of the battery after the battery is renewed.
Figure 6B:
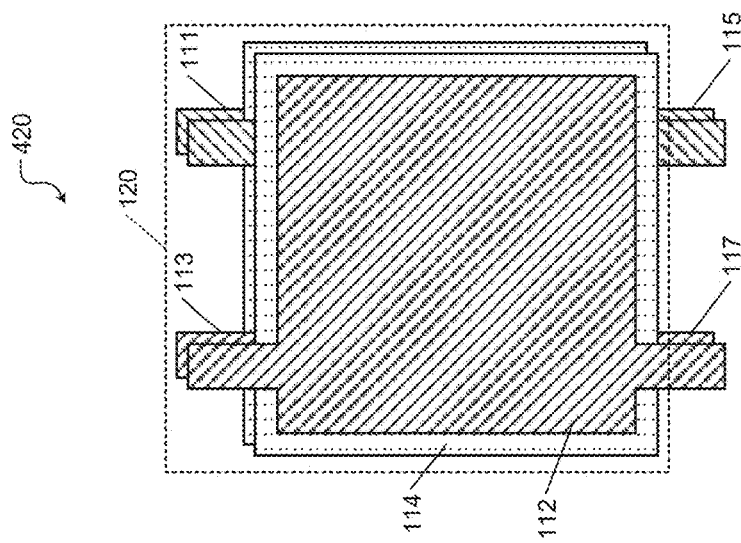
FIGS. 6A and 6B show a method of renewing a battery with each cell having an extra pair of tabs.
Figure 6A:
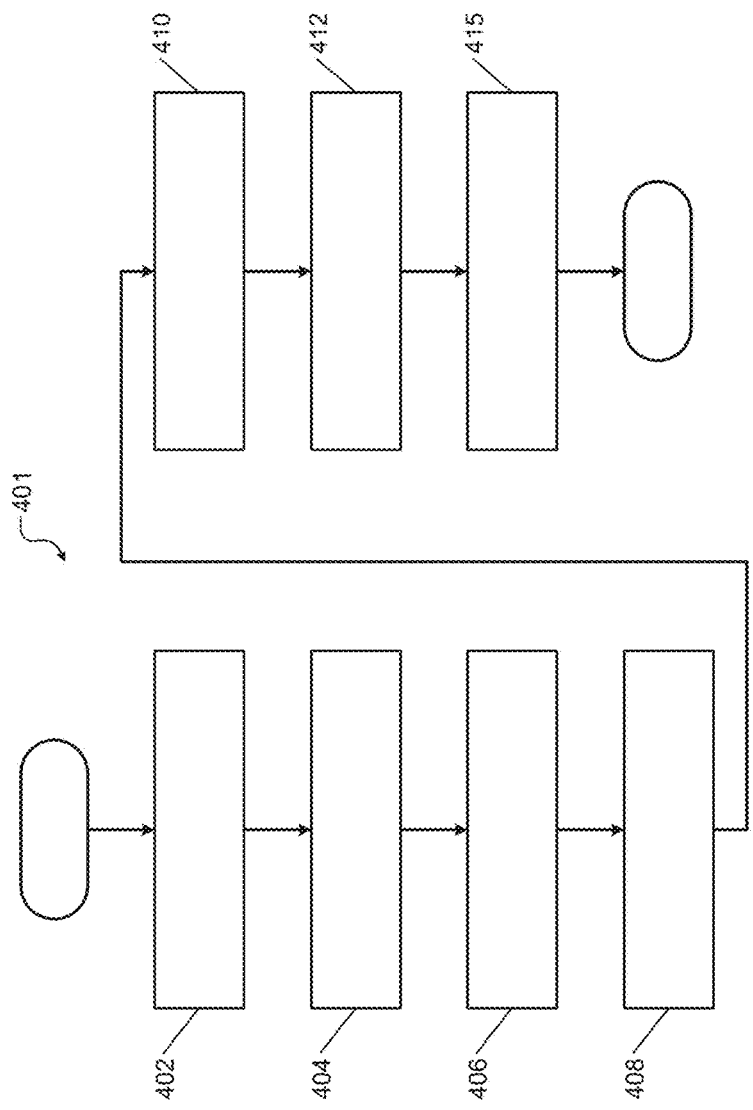

The present disclosure is organized as follows. FIG. 1 shows an example of a battery comprising a stack of cells. FIGS. 2A-2D show degradation of a cell due to repeated discharging and recharging. FIGS. 3A-3C show a system for re-lithiating the cells. FIG. 4 shows a method of re-lithiating the cells. FIG. 5 shows an example of a battery with each cell having an extra pair of tabs that can be used as terminals of the battery after the battery is renewed. FIGS. 6A and 6B show a method of renewing a battery with each cell having an extra pair of tabs.

Throughout the present disclosure, only one type of cell is shown as an example to illustrate the system and method of the present disclosure. However, the teachings of the present disclosure can also be used to renew other types of rechargeable cells. Non-limiting examples of the battery cells that can be processed using the system and method of the present disclosure include cylindrical battery cells and prismatic battery cells.

FIG. 1 shows components and internal structure of a rechargeable battery 100. The battery 100 comprises a stack 104 of cells 102. Each cell 102 comprises two electrodes: a cathode 110 and an anode 112. A separator 114 is arranged between the cathode 110 and the anode 112 to separate the cathode 110 and the anode 112. The cathode 110 and the anode 112 are similar in shape and size (e.g., rectangular in the example shown). The separator 114 is greater in size than the cathode 110 and the anode 112 to completely separate the cathode 110 and the anode 112 from each other.

In each cell 102, the separator 114 is stacked on the cathode 110, and the anode 112 is stacked on the separator 114. For example, the separator 114 can be stacked layer by layer. Alternatively, separator 114 can be wound into layers between the cathode 110 and the anode 112. The stacking process is repeated to form the stack 104 of the cells 102. The stack 104 is enclosed in a container 120 of the battery 100. The container 120 is then filled with electrolyte. Thereafter, the container 120 is degassed and sealed.

In the following description, various tabs arranged on the cathode 110 and the anode 112 (collectively called the electrodes) are described. A tab is a terminal of an electrode (i.e., a connection provided on an electrode) that is used for making an electrical connection between the electrode and a circuit outside the battery. Throughout the present disclosure, the specific positions of the tabs (i.e., original tabs and extra tabs described below) are shown and described for example only. These tabs can be located anywhere on the respective electrodes. For example, the tabs of the cathode and anode can be on the same ends (as shown) or on opposite ends of the respective electrodes. Further, the tabs can be on any side of the respective electrode. As used herein, the first and second ends are respectively the top and bottom ends of the electrodes as shown in the figures, and the first and second sides are respectively the right and left sides of the electrodes as shown in the figures. Furthermore, the alignments of the tabs on the electrodes are also shown for example only and are non-limiting (i.e., alignments described are unnecessary).

For example, the cathode 110 includes a tab 111 on a first end of the cathode 110. The cathode 110 does not include a tab on a second end of the cathode 110 that is opposite to the first end of the cathode 110. The tab 111 is arranged proximate to a first side of the cathode 110. The tab 111 is closer to the first side of the cathode 110 than to a second side of the cathode 110 that is opposite to the first side of the cathode 110.

The anode 112 includes a tab 113 on a first end of the anode 112. The anode 112 does not include a tab on a second end of the anode 112 that is opposite to the first end of the anode 112. The first ends of the cathode 110 and the anode 112 are aligned with each other. The second ends of the cathode 110 and the anode 112 are aligned with each other. The tab 113 is arranged proximate to a second side of the anode 112. The second side of the anode 112 is opposite to the first side of the cathode 110. The tab 113 is closer to the second side of the anode 112 than to a first side of the anode 112 that is opposite to the second side of the anode 112.

When the separator 114 is stacked on the cathode 110 and the anode 112 is stacked on the separator 114 to form the cell 102, the tab 111 of the cathode 110 and the tab 113 of the anode 112 are on the same end (e.g., a top end) of the cell 102 but are on opposite sides (e.g., right and left sides) of the cell 102. When the stack 104 of the cells 102 is arranged in the container 120 and the container is sealed, the tabs 111 and 113 protrude and extend out of one end (e.g., top end) of the container 120. The tabs 111 of the cells 102 in the stack 104 are connected to each other. The tabs 113 of the cells 102 in the stack 104 are connected to each other. The tabs 111 are not connected to the tabs 113. The tabs 111 and 113 are coupled (e.g., welded) to respective bus bars for electrically connecting the battery 100 to other circuits to which the battery 100 supplies power.

FIGS. 2A-2D show degradation of a rechargeable battery 200 due to repeated discharging and recharging of the battery 200. In FIGS. 2A-2D, the battery 200 comprises a cathode material 202 separated from an anode material 204 by a separator 206. A positive current collector (e.g., aluminum foil) 208 abuts the cathode material 202. A negative current collector (e.g., copper foil) 210 abuts the anode material 204.

Figure 2A:
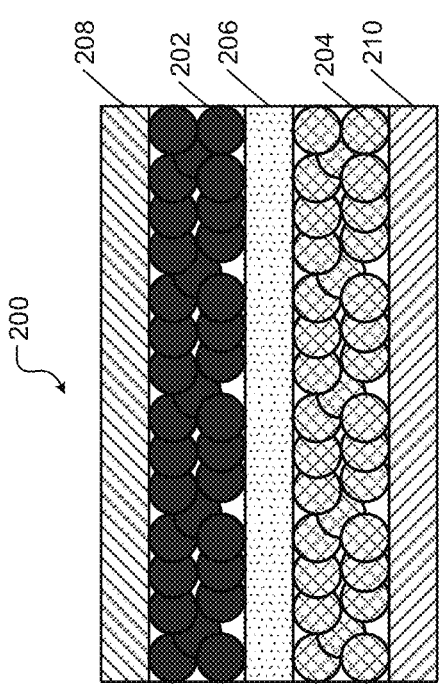
FIGS. 2A-2D show degradation of a cell of the rechargeable battery due to repeated discharging and recharging.
Figure 2B:
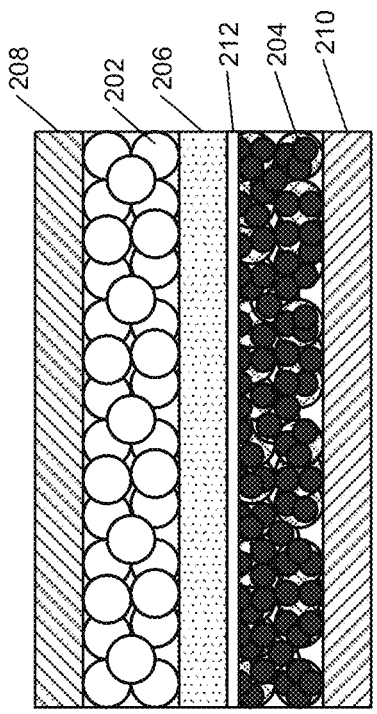

FIG. 2A shows the battery 200 at beginning of life (i.e., when the battery 200 is new). All of the lithium ions are stored on the cathode side. FIG. 2B shows the battery 200 when the battery 200 is charged. The anode 204 is fully lithiated when the battery 200 is fully charged. A solid electrolyte interface (SEI) 212 is formed on the anode side. The SEI 212 traps lithium ions, which cannot travel between the cathode and the anode. A capacity of a battery depends on the number of lithium ions that can travel between the positive (cathode) and the negative (anode) electrodes. At the beginning of life of the battery 200, the SEI 212 is thin and provides minimal impedance to the flow of lithium ions across the electrodes. Over time, however, the SEI 212 grows in thickness, and more trapped lithium ions became unavailable during charging and discharging, which degrades battery capacity.

Figure 2C:
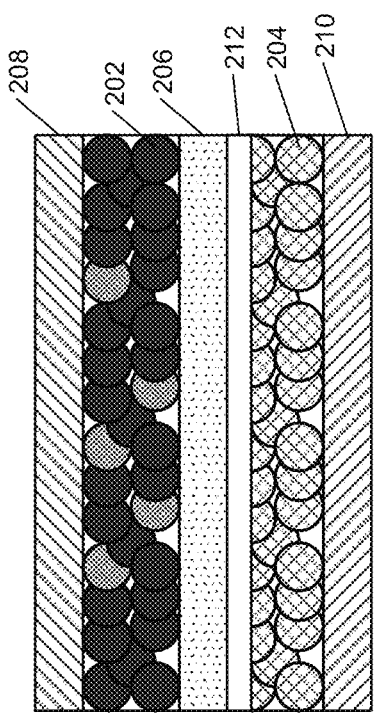
Figure 2D:
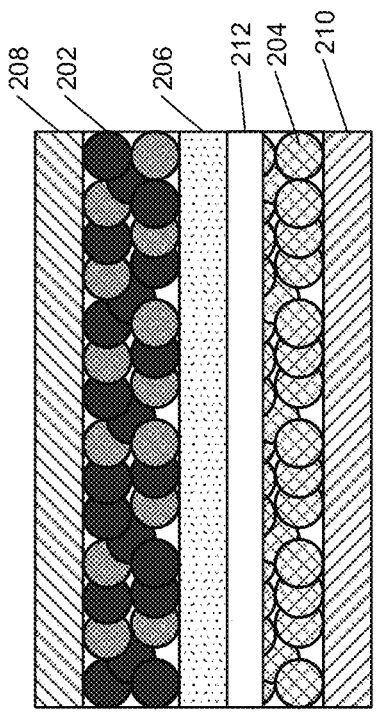

FIG. 2C shows the battery 200 when the battery 200 is discharged. Due to a thicker SEI 212, the cathode 202 is partially lithiated. FIG. 2D shows the battery 200 at the end of life. The SEI 212 is thick and traps a large amount (e.g., 20%) of the lithium ions, which become unavailable during charge/discharge cycling leading to capacity fading. The capacity of the battery 200 is diminished to a point where the battery 200 is deemed to be at the end of life. The battery 200 is discarded and recycled, and is replaced by a new battery.

FIGS. 3A-3C show a system 300 for renewing a battery that has reached end of life. FIG. 4 shows a method 400 for renewing a battery that has reached end of life using the system 300. In FIG. 3A, the system 300 comprises an electrolyte bath 302 comprising an electrolyte 304. The stack 104 of cells 102 of the battery 100 is first cleaned as described below with reference to FIG. 4. The cleaned stack is then immersed in the electrolyte bath 302 comprising the electrolyte 304.

Additionally, a lithium sheet 310 having a tab 311 is also immersed in the electrolyte bath 302 comprising the electrolyte 304. For example, the lithium sheet 310 is shown to have a similar size and shape as that the cathodes 110 and the anodes 112. Instead, the lithium sheet 310 can be simply a piece of lithium metal and can have any size and shape. Accordingly, the lithium sheet 310 can be generally simply referred to as lithium metal 310.

The system 300 further comprises a circuit (e.g., a potential stat) 320 for re-lithiating the cells 102 as described below with reference to FIGS. 3B and 3C. The circuit 320 comprises a charging circuit 322, a discharging circuit 324, and a control circuit 326. The circuit 320 is connected across the lithium sheet 310 and the cathodes 110 of the cells 102. That is, the circuit 320 is connected across the tabs 311 and 111. The control circuit 326 connects the charging circuit 322 and the discharging circuit 324 to the cells 102 to re-lithiate the cells 102. The operation of the system 300, which re-lithiates the cells 102 using the circuit 320, is described below with reference to FIGS. 3B and 3C. During the re-lithiation process described below, the term cell or cells comprises the cathode(s) 110 of the cells 102 and the lithium metal 310.

FIGS. 3B and 3C show a method 350 for determining an amount of re-lithiation required to renew the battery 100 using the system 300. The method 350 is described with reference to FIGS. 3A and 3C. FIG. 3C shows graphs of voltage V versus capacity C of the cells. $V_0$ is the voltage of the cells at the start of the re-lithiation process when the cathodes 110 of the cells 102 and the lithium sheet 310 are connected to the circuit 320 to perform re-lithiation of the cells 102. $V_{max}$ and $V_{min}$ are charge and discharge voltage limits, which are determined by the chemistry of the cathode material 110 paired with lithium metal 310. $V_0$ is greater than $V_{min}$ due to the lithium deficient cathode material 110 when the battery 100 is at the end of life.

In FIG. 3B, at 352, the method 350 determines a charge capacity C1 of the cathode 110 by charging the cells to $V_{max}$ by supplying a constant current and a constant voltage to the cells. For example, in FIG. 3A, the control circuit 326 connects the charging circuit 322 across the tabs 311 and 111, and the charging circuit 322 supplies the constant current through the tabs 311 and 111 until the cells are charged to $V_{max}$. The charging circuit 322 supplies the constant voltage across the tabs 311 and 111 to hold the voltage at $V_{max}$ until the cell current decays to a predetermined limit. The amount of charge transferred to the cells to raise the voltage of the cells from $V_0$ to $V_{max}$ is the charge capacity C1 of the cells.

At 354, the method 350 determines a discharge capacity (C2−C1) of the cathode 110 by discharging the cells to $V_{min}$ at a constant current. For example, in FIG. 3A, the control circuit 326 disconnects the charging circuit 322 and connects the discharging circuit 324 across the tabs 311 and 111. The discharging circuit 322 sinks the constant current until the voltage across the tabs 311 and 111 falls to $V_{min}$. The amount of charge drawn from the cells to decrease the voltage of the cells from $V_{max}$ to $V_{min}$ is the discharge capacity (C2−C1) of the cells 102.

At 356, the method 350 determines the desired capacity for re-lithiation of the cells 102 using the equation ΔC=(C2−C1)−C1=C2−2C1. ΔC is determined only once for the cells 102 of the battery 100. Then the known ΔC can be used to renew multiple batteries similar to the battery 100 comprising the cells 102 using the system 300. At 358, the method 350 applies the discharge current until ΔC is reached during re-lithiation, as shown at 360 in FIG. 3C. For example, in FIG. 3A, the discharging circuit 326 discharges the cells 102 until ΔC is reached during re-lithiation.

FIG. 4 shows a method 400 for renewing a battery (e.g., the battery 100) that has reached end of life. The method 400 is performed using the system 300 and the method 350. At 402, the stack 104 of the cells 102 is removed from the container 120 of the battery 100. At 404, the stack 104 is vacuumed to remove old electrolyte from the cells 102. At 406, the vacuumed stack 104 is then rinsed in a solvent (e.g., dimethyl carbonate or DMC). At 408, the rinsed stack 104 is dried (to dry the cathode and anode electrodes) using heat and/or vacuum. The stack 104 is now ready for re-lithiation using the system 300.

At 410, the stack 104 is re-lithiated as described above with reference to FIGS. 3A-3C. At 412, the re-lithiated stack 104 is placed in a new battery container. At 414, new electrolyte is filled in the container, the container is degassed, new sealant is added to the tabs, and the new container is sealed to form a renewed battery. The renewed battery is as good as the new battery 100 in all respects.

FIG. 5 shows a battery 101 with an additional tab added to each of the cathode and anode electrodes when the battery 101 is initially manufactured. The battery 101 is identical to the battery 100 shown in FIG. 1 except that the battery 101 has the following additional tabs in addition to all of the other features of the battery 100. These other features are already shown and described with reference to FIG. 1 and are therefore not described again for brevity.

In FIG. 5, the cathode 110 includes the tab 111, and the anode 112 includes the tab 113. In addition, the cathode includes a tab 115, and the anode 112 includes a tab 117. For example only, while the tab 111 is on the first end (e.g., top end) of the cathode 110, the tab 115 is on the second end (e.g., bottom end) of the cathode 110 that is opposite to the first end of the cathode 110. The tabs 111 and 115 are arranged proximate to the first side of the cathode 110. The tabs 111 and 115 are closer to the first side of the cathode 110 than to the second side of the cathode 110 that is opposite to the first side of the cathode 110. The tabs 111 and 115 may be collinear (i.e., may lie along a straight line parallel to an axis passing through centers of the first and second ends of the cathode 110).

In the anode 112, for example only, while the tab 113 is on the first end (e.g., top end) of the anode 112, the tab 117 is on the second end (e.g., bottom end) of the anode 112 that is opposite to the first end of the anode 112. The tabs 113 and 117 are arranged proximate to the second side of the anode 112. The second side of the anode 112 is opposite to the first side of the cathode 110. The tabs 111 and 115 are closer to the second side of the anode 112 than to the first side of the anode 112 that is opposite to the second side of the anode 112. The tabs 113 and 117 may be collinear (i.e., may lie along a straight line parallel to an axis passing through centers of the first and second ends of the cathode 112.

For example, when the separator 114 is stacked on the cathode 110 and the anode 112 is stacked on the separator 114 to form the cell 102, the tab 111 of the cathode 110 and the tab 113 of the anode 112 are on the first end (e.g., top end) of the cell 102 but are on opposite sides (e.g., on right and left sides) of the cell 102. The tab 115 of the cathode 110 and the tab 117 of the anode 112 are on the second end (e.g., bottom end) of the cell 102 that is opposite to the first end of the cell 102 and are also on the opposite sides of the cell.

When the stack 104 of the cells 102 is arranged in the container 120 and the container 120 is sealed, the tabs 111 and 113 protrude and extend out of a first end (e.g., top end) of the container 120, and the tabs 115 and 117 do not protrude and do not extend out of a second end (e.g., bottom end) of the container 120 that is opposite to the first end of the container 120. The tabs 115 of the cells 102 in the stack 104 are connected to each other. The tabs 117 of the cells 102 in the stack 104 are connected to each other. The tabs 115 are not connected to the tabs 117. The tabs 115 and 117 are not coupled (e.g., welded) to respective bus bars for electrically connecting the battery 100 to other circuits to which the battery 100 supplies power. The tabs 115 and 117 are unused until the battery 101 reaches end of life and is subsequently renewed.

Accordingly, when the battery 101 reaches end of life, the processing of the battery 101 is simplified due to the presence of the extra pair of tabs 115 and 117. After re-lithiation, the cells 102 are packaged in a new container such that the old tabs 111 and 113 are now contained in the container. Instead of reusing the tabs 111 and 113 to connect the renewed battery to the external circuits, the unused tabs 115 and 117 are now used connect the renewed battery to the external circuits. Using the previously unused tabs 115 and 117 instead of reusing the old tabs 111 and 113 improves the processing time involved in finishing the renewed battery and improves the electrical contacts of the renewed battery with the external circuits. If one or more of the tabs 111 and 113 are accidentally damaged while removing the stack 104 from the battery and preparing the stack 104 for re-lithiation, the tabs 115 and 117 are ready for connecting the renewed battery to external circuits.

FIGS. 6A and 6B show a method 401 of renewing a battery having the extra tabs described above. FIG. 6A shows the method 401, and FIG. 6B shows a renewed battery 420 produced using the method 401 and the system 300 including the extra tabs that are ready for use with external circuits. The method 401 is identical to the method 400 shown and described with reference to FIG. 4 except that step 415 of the method 401 differs from step 414 of the method 400 as described below. Other than this difference, the steps 402-412 of the method 401 are identical to the steps 402-412 of the method 400 and are therefore not described again for brevity. At 415, new electrolyte is filled in the container, the container is degassed, and the container is sealed enclosing the old tabs 111 and 113 to form the renewed battery 420. The renewed battery 420 is as good as the new battery 100 with new tabs 115 and 117 to connect to external circuits and to supply power from the renewed battery 420 to the external circuits.

FIG. 6B shows the renewed battery 420 produced using the method 401 and the system 300. The tabs 115 and 117 protrude and extend out of the second end (e.g., bottom end) of the container 120, and the tabs 111 and 113 do not protrude and do not extend out of the first end (e.g., top end) of the container 120 that is opposite to the second end of the container 120. The tabs 115 of the cells 102 in the stack 104 are already connected to each other when the battery 101 was manufactured. The tabs 117 of the cells 102 in the stack 104 are already connected to each other when the battery 101 was manufactured. The tabs 115 are not connected to the tabs 117. The tabs 115 and 117 are now coupled (e.g., welded) to respective bus bars for electrically connecting the renewed battery 420 to other circuits to which the battery 420 supplies power. The tabs 111 and 113 are contained in the container 120 and are not coupled (e.g., welded) to respective bus bars for electrically connecting the renewed battery 420 to other circuits to which the battery 420 supplies power. The tabs 111 and 113 remain unused in the container 120 of the renewed battery 420.

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A method of recycling a Lithium-ion battery, the method comprising:

removing a plurality of cells from a container of the Lithium-ion battery without dismantling the cells;
removing an electrolyte from the cells;
re-lithiating the cells using lithium as a source of re-lithiation; and
packaging the re-lithiated cells in a new container to form a new battery.

2. The method of claim 1 further comprising cleaning the cells by (i) vacuuming the cells, (ii) rinsing the vacuumed cells in a solvent, and (iii) drying the rinsed cells by heating and/or vacuuming the rinsed cells.

3. The method of claim 1 wherein the re-lithiating the cells comprises:

immersing the cells in an electrolyte bath;
immersing a sheet of lithium metal in the electrolyte bath; and
connecting a charging/discharging circuit across the sheet of lithium metal and one of two electrodes of the cells.

4. The method of claim 3 further comprising:

determining a charge capacity of the cells by charging the cells from a first voltage of the cells at a start of the re-lithiating to a second voltage greater than the first voltage at a first current using the charging/discharging circuit;
determining a discharge capacity of the cells by discharging the cells from the second voltage to a third voltage less than the first voltage at a second current using the charging/discharging circuit; and
determining an amount of the re-lithiating based on the charge and discharge capacities.

5. The method claim 4 further comprising performing the re-lithiating of the cells using the charging/discharging circuit based on the amount of the re-lithiating based on the charge and discharge capacities.

6. The method of claim 5 wherein the amount is a difference between the discharge capacity and the charge capacity.

7. The method of claim 1 further comprising:

filling the new container with a new electrolyte;
degassing the new container;
adding a sealant to connections of electrodes of the cells; and
sealing the new container.

8. The method of claim 1 wherein each cell includes a first pair of connections used before the recycling and a second pair of connections unused before the recycling, the method further comprising:

enclosing the re-lithiated cells in the new container such that the first pair of connections is enclosed in the new container and the second pair of connections is connectable to circuits outside the new battery;
filling the new container with a new electrolyte;
degassing the new container; and
sealing the new container.

* * * * *